S. B. NOÉ.
MAXIMUM PRESSURE INFLATING VALVE AND GAUGE.
APPLICATION FILED MAR. 1, 1921.

1,423,447.

Patented July 18, 1922.
2 SHEETS—SHEET 1.

WITNESSES

INVENTOR
SAMUEL B. NOÉ.
BY
ATTORNEYS

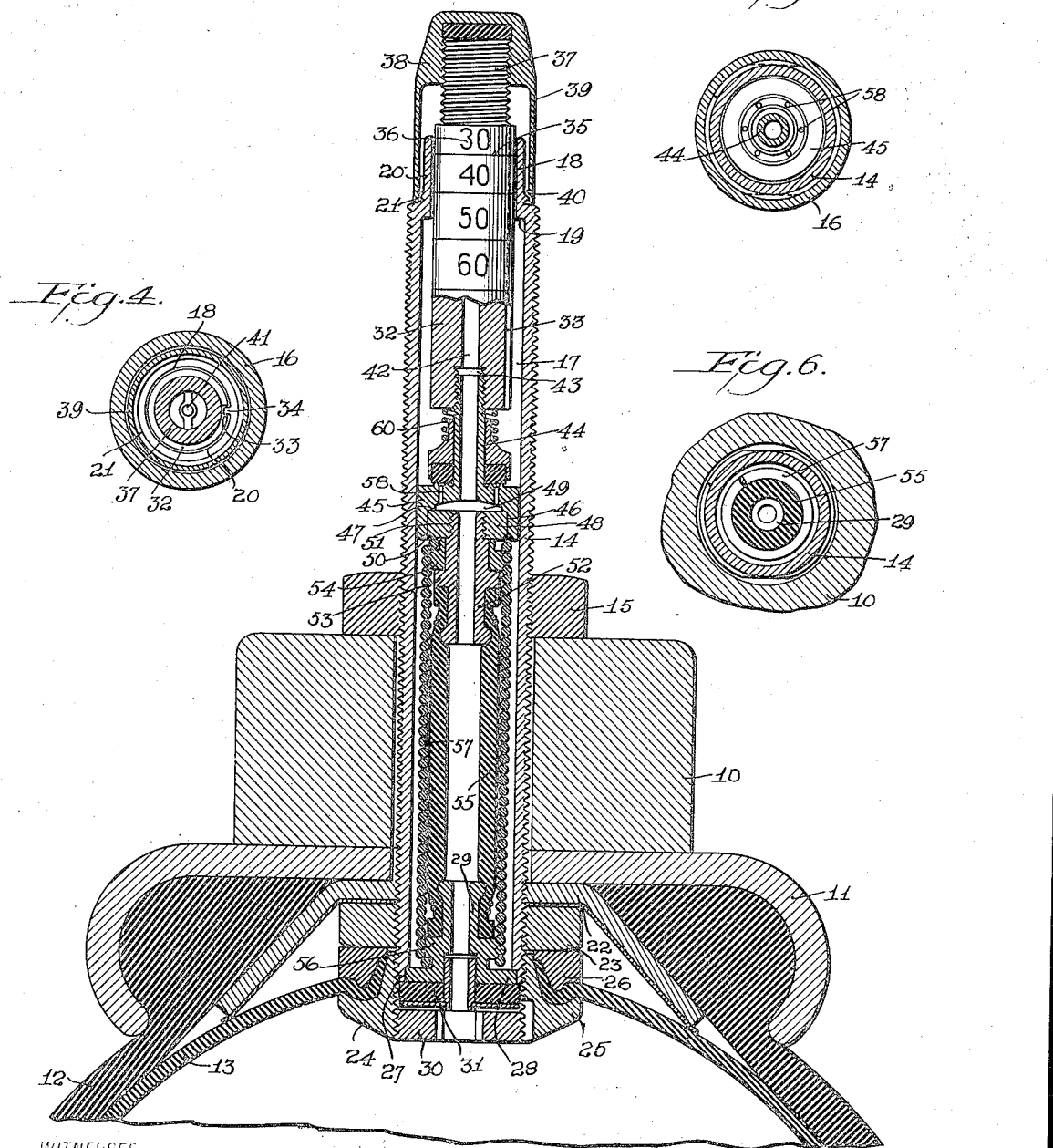

UNITED STATES PATENT OFFICE.

SAMUEL B. NOÉ, OF OCEAN GROVE, NEW JERSEY.

MAXIMUM-PRESSURE INFLATING VALVE AND GAUGE.

1,423,447.  Specification of Letters Patent.  Patented July 18, 1922.

Application filed March 1, 1921. Serial No. 448,842.

*To all whom it may concern:*

Be it known that I, SAMUEL B. NOÉ, a citizen of the United States, and a resident of Ocean Grove, in the county of Monmouth and State of New Jersey, have invented a new and Improved Maximum-Pressure Inflating Valve and Gauge, of which the following is a full, clear, and exact description.

This invention relates to the inflation of pneumatic tires or other bodies adapted to receive air under pressure and has particular reference to a combined maximum pressure inflating valve and pressure gauge therefor.

The invention contemplates the provision of a device of the character described which is designed for permanent association with a pneumatic tire for effecting the inflation of the same, for gaging the pressure thereof and for automatically discharging excess pressure above a predetermined degree.

With the above recited and other objects in view, some of which will be more readily appreciated as the nature, purpose and operation of the device is more fully understood, reference is had to the following specification, the appended claims and the accompanying drawings, in which;

Figure 3 is a longitudinal sectional view through the valve applied to the tire illustrating the gauge depressed and the retaining means for holding and housing the same in depressed position to protect the same during the insertion of the valve stem through the opening in the felly.

Figure 4 is a transverse sectional view taken approximately on the line 4—4 of Figure 1.

Figure 5 is a similar view taken on the line 5—5 of Figure 1.

Figure 6 is a similar view taken on the line 6—6 of Figure 1.

Figure 1:
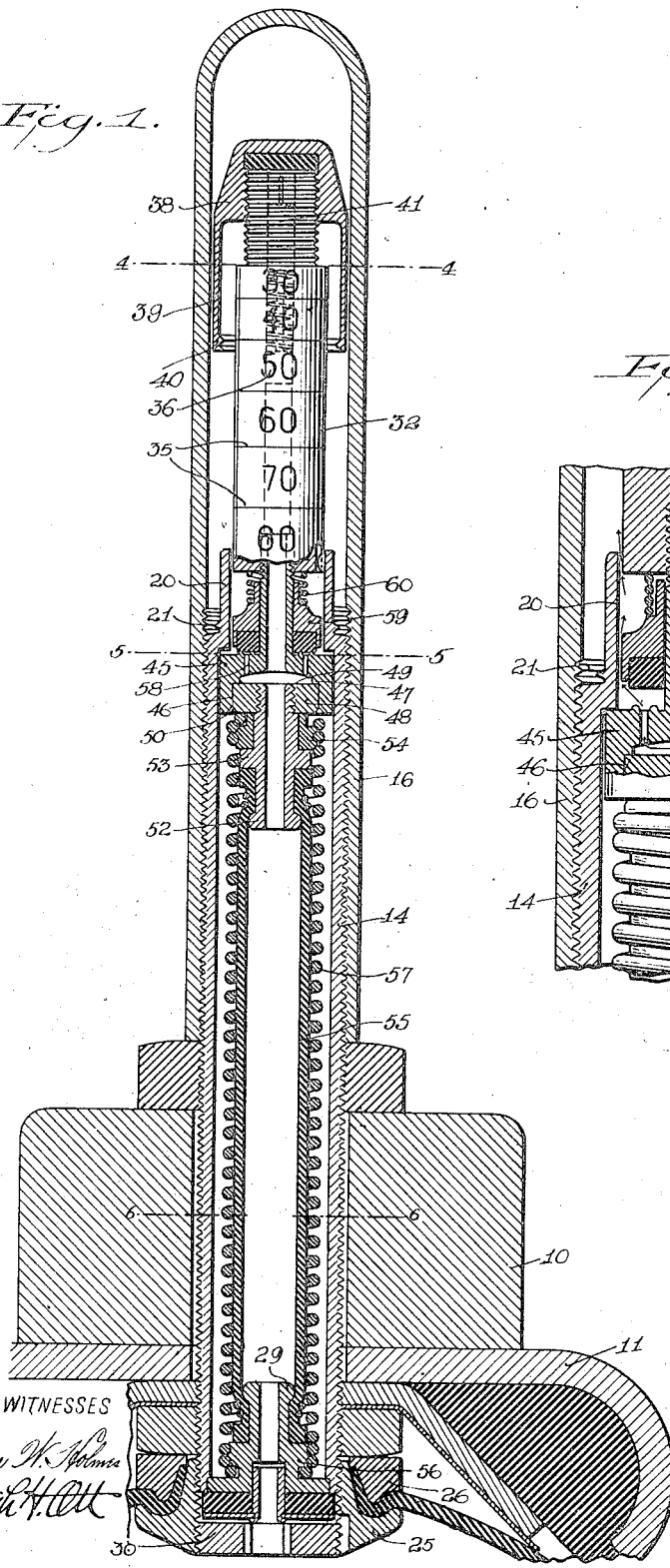
Figure 1 is a longitudinal sectional view through the valve associated with a tire and illustrating the position of parts when the gauge is extended under pressure.

Referring to the drawings by characters of reference, 10 designates the felly of a wheel having the usual tire rim 11 thereon and illustrating the shoe or casing 12 in applied position with the inner tube 13 disposed therein.

The combination maximum pressure inflating valve and pressure gauge which constitutes the invention includes an outer cylindrical sleeve 14 which is exteriorly threaded throughout its length for the reception of the retaining nut 15 and the dust cap 16. This retaining sleeve is provided with an enlarged bore 17 extending from its inner end to a point short of its outer extremity where the bore is substantially reduced as at 18 forming an internal annular shoulder 19. The outer periphery of the outer extremity of said sleeve is substantially reduced to provide the nipple 20 which is provided with a single thread 21 at the juncture of said nipple with the sleeve. The inner extremity of the sleeve is provided with the usual brace 22 and binding or stop nut 23 threaded thereover. A removable head 24 is threaded thereon and is adapted to clamp the edges of the inflating opening of the tire between the flange 25 thereof and the ring 26 which is forced against the nut 23. The bore 17 at the extreme inner end is provided with an annular rabbet 27 which receives the flange 28 of a nipple 29. A centrally apertured retaining nut 30 is threaded into the bore of the head and co-acts with the gasket 31 to retain the flange in the rabbet 27. The nipple 29 constitutes a portion of the inner member of the valve which includes the gauge sleeve 32, the diameter of which is slightly less than the diameter of the reduced bore 18 of the outer sleeve member. The gauge sleeve 32 is provided with a longitudinal key way 33 which co-acts with the rib or key 34 provided in the reduced bore to prevent relative rotation of the gauge sleeve and the outer sleeve member 14. The exterior surface of the gauge sleeve is provided with a plurality of circumferential graduations 35 and indicia 36 which co-act with the outer end of the nipple 20 to indicate the internal pressure and permit of readings being taken to determine the same. The outer extremity of the gauge sleeve is provided with a reduced exteriorly threaded extension 37 for the reception of a closure cap 38. The closure cap is provided with a peripheral axially extending cylindrical flange 39 having an internal thread 40 adjacent its outer end which is designed to coact with the external thread 21 of the nipple 20 for retaining the gauge sleeve depressed. A check valve 41 of any suitable construction is illustrated in dotted lines in Figure 1 of the drawings, the same preferably being of the Schroeder type, said valve functioning to permit of the intake of air to the sleeve but operating to prevent its escape therefrom. The inner extremity of the bore 42 of the gauge sleeve is enlarged and internally threaded as at 43 for the reception of the threaded outer end of the shank or neck 44 of an enlarged head 45. The head 45 is of a diameter corresponding substantially to the enlarged bore 17 of the outer sleeve 14 and is adapted for sliding movement therein with the gauge sleeve. The inner end of the head is provided with an enlarged axial recess 46 having an internal annular shoulder 47 against which a closure disc 48 is adapted to seat for closing the recess to provide in the head an enlarged chamber 49. Preferably solder 50 or any other suitable means may be employed for sealing the closure disc 48 in place. The disc 48 is provided with a central threaded bore 51 into which the inner threaded extremity of the nipple 52 is screwed. A centrally arranged annular flange 53 is formed exteriorly of the nipple 52 and an externally threaded sleeve 54 is confined between said flange and the disc 48 when the nipple is screwed into the bore 51. The opposite extremities of an elastic tube 55 respectively receive the nipples 52 and 29 to establish a closed extensible conduit therebetween. The nipple 29 is provided with an externally threaded enlarged annular flange 56 and the convolutions of one extremity of a coiled contractile spring 57 are threaded over said flange, the convolutions of the other end of said spring being threaded on the sleeve 54. The enlarged head 45 is provided with a plurality of outlet openings 58 extending axially therethrough from the chamber 49 and a sleeve valve 59 is mounted on the neck or shank 44 for longitudinal sliding movements. A coiled spring 60 is interposed between the sleeve valve and the gauge sleeve and functions to normally exert a tension against said valve to shift the same into a position to close the outlet openings 58.

Figure 2:
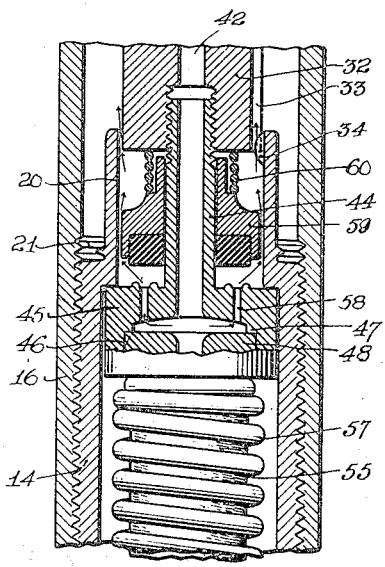
Figure 2 is a fragmentary longitudinal sectional view illustrating the position of parts when the gauge is extended under pressure to the limit of its movement and the maximum pressure valve is opened to permit of the escape of the excess pressure.

In use and operation of the device, when the cap 38 is removed the air may be pumped through the valve 41 in the sleeve, thence through the bore 42 thereof, the shank 44, the nipple 52, the tube 55, the nipple 29 and into the inner tube 13. The pressure will extend the tube 55 and the coiled contractile spring 57 thereby projecting the gauge sleeve from the outer extremity of the outer sleeve or stem 14 whereby upon reading the indicia and graduations on the outer end of the stem, the internal pressure of the tube may be determined. When the pressure in the tire reaches a predetermined degree, the extension of the tube and spring will effect the contact of the enlarged head 45 with the shoulder 19 thus limiting the outward projection of the gauge sleeve from the outer sleeve or stem. When the pressure exceeds a predetermined maximum after the head 45 has engaged the shoulder 19, the sleeve valve 59 will be unseated as illustrated in Figure 2 to permit of the escape of the excess pressure through the outlet openings 58. It will thus be seen that a combination maximum pressure inflating and pressure gauge valve is provided which is entirely automatic in operation and it will be readily appreciated that the escape of the excess pressure through the outlet openings 58 will constitute a signal to audibly indicate that the pressure has reached the maximum. It should be further noted that the construction and arrangement of the inner sleeve together with the extensible tube constitutes substantially an integral element which greatly facilitates its insertion and removal. In applying the tire to the felly, the thread 40 of the cap 38 is engaged with the thread 21 to retain the gauge depressed whereby the same is protected while the stem is inserted through the felly opening. The spring 57 functions when the pressure is diminished to retract the gauge sleeve and its associated parts within the outer sleeve 14. It should be noted that the inner periphery of the convolutions of said spring are of substantially the same diameter as the outer periphery of the elastic tube 55 thus functioning at all times as a protective housing and at the same time preventing radial expansion or distortion of the tube. In practice the spring 60 which normally retains the sleeve valve 59 in closed position may be adjusted to operate under varying degrees of pressure whereby the maximum pressure may be increased or decreased at will. When it is desired to withdraw the inner sleeve, extensible conduit and associated parts, it is only necessary to remove the retaining nut 30 and the gasket 31 leaving the opening in the inner end free to effect the withdrawal thereof. Any of the several parts are removable or detachable to permit of their replacement or repair thus obviating the necessity of discarding the entire device should any of the several parts become worn or unfit for use.

While there has been illustrated and described a single and preferred embodiment of the invention, it is to be understood that the right is reserved to embodiments other than those actually illustrated herein, to the full extent indicated by the general meaning of the terms in which the claims are expressed and by variations in the phraseology of the same.

I claim:

1. A maximum pressure inflating valve and gauge for inflatable bodies, comprising inner and outer telescopic sleeves, said inner sleeve having an inwardly opening check valve, an extensible elastic conduit connecting the inner ends of said sleeves and establishing communication between the inner sleeve and the inflatable body, means for limiting the projection of the inner sleeve from the outer end of the outer sleeve and means carried by the inner sleeve for receiving the inflatable body of excess pressure above a predetermined maximum.

2. A maximum pressure inflating valve and gauge comprising an outer sleeve connected at one end to an inflatable body, an inner sleeve slidably in the outer sleeve and having an inwardly opening check valve, an extensible connection between the inner end of said sleeves and establishing communication between the inflatable body and the inner sleeve, means for preventing relative separation of the sleeves and limiting the projection of the inner sleeve from the outer end of the outer sleeve, means for normally effecting the retraction of the inner sleeve within the outer sleeve, said means being extensible by the internal pressure, and means carried by the inner sleeve for relieving the inflatable body of excess pressure above a predetermined maximum.

3. In a maximum pressure inflating valve and gauge for inflatable bodies, an outer cylindrical sleeve adapted to be secured at its inner end to said body, an inner sleeve having external graduations and indicia on its outer surface and an inwardly opening check valve arranged within the outer end of its bore, an elastic tubular connection between the inner ends of said sleeves adapted to be extended by the internal pressure for effecting the projection of said inner sleeve through the outer end of the outer sleeve, means for limiting the outward projection of said inner sleeve and means carried by said inner sleeve and operable by the internal pressure contained therein for effecting the discharge of excess pressure above a predetermined maximum.

4. In a maximum pressure inflating valve and gauge for inflatable bodies, an outer cylindrical sleeve adapted to be secured at its inner end to said body, an inner sleeve having external graduations and indicia on its outer surface and an inwardly opening check valve arranged within the outer end of its bore, an elastic tubular connection between the inner ends of said sleeves adapted to be extended by the internal pressure for effecting the projection of said inner sleeve through the outer end of the outer sleeve, means for limiting the outward projection of said inner sleeve and means carried by said inner sleeve and operable by the internal pressure contained therein for effecting the discharge of excess pressure above a predetermined maximum, and a closure for the outer end of said inner sleeve having means adapted to co-act with the outer sleeve for retaining and holding the same within said outer sleeve against the internal pressure of the inflatable body for the purpose specified.

5. In a maximum pressure inflating valve and gauge for inflatable bodies, an outer cylindrical sleeve adapted to be secured at its inner end to said body, said sleeve having a reduced internal bore at its outer end constituting a stop shoulder, an inner sleeve movable through the reduced bore of the outer sleeve having external graduations and indicia adapted to co-act with the outer end of said outer sleeve to constitute a gauge, an inwardly opening check valve in the bore of said inner sleeve, an enlarged head carried by the inner end of the inner sleeve, operable in the main bore of the outer sleeve and adapted to co-act with the stop shoulder to limit the outward movement of the inner sleeve, an elastic tubular conduit connected with the head and the inner end of the outer sleeve for establishing communication between the outer sleeve and the inflatable body, said conduit being extensible by the internal pressure within the inflatable body to effect the outward projection of the inner sleeve from the outer end of the outer sleeve, and a maximum pressure valve carried by the head and operable for relieving the inflatable body of excess pressure above a predetermined maximum.

6. The combination with an inflatable body adapted to withstand a predetermined degree of pressure, of means attached thereto for inflating said body, gaging the pressure therein and automatically discharging excess pressure above a predeterimned maximum, comprising an outer sleeve secured to the inflatable body at its inner end, an inner sleeve telescopically received by and projectable through the outer end of said outer sleeve, means for limiting said projection of the inner sleeve, an extensible conduit respectively connecting the inner ends of the sleeves and establishing communication between the inflatable body and the inner sleeve, an inwardly opening check valve in the inner sleeve, an outlet in the inner sleeve, and a closure for normally sealing said outlet and operable to relieve the body of excess pressure above a predeterminel maximum.

7. A maximum pressure inflating valve and gauge for inflatable bodies, comprising inner and outer telescopic sleeves, an extensible elastic conduit connecting the inner ends of the sleeves and serving to establish communication between the inflatable body and said inner sleeve, an inwardly opening check valve in said inner sleeve, an outwardly opening excess pressure valve in said inner sleeve, and means for limiting the projection of the inner sleeve from the outer sleeve.

8. A maximum pressure inflating valve and gauge for inflatable bodies comprising an outer sleeve connected at its inner end to said body, an inner sleeve telescopically arranged in the outer sleeve, an extensible elastic conduit connecting the inner ends of the sleeves and serving to establish communication between the inner sleeve and the inflatable body, an inwardly opening check valve in the outer sleeve, said inner sleeve adapted to be projected through the outlet sleeve by the internal pressure, means for limiting the projection of said inner sleeve, and an outwardly opening check valve carried by the inner sleeve, and adapted to relieve the inflatable body of pressure in excess of a predetermined maximum.

9. A maximum pressure inflating valve and gauge for inflatable bodies comprising an outer sleeve adapted for connection at its inner end with said body, said sleeve having its bore reduced adjacent its outer end to provide an annular internal stop shoulder, an inner sleeve telescopically arranged in said outer sleeve and projectable through said reduced bore, an inwardly opening check valve in said sleeve, a reduced neck extending inwardly from said hollow sleeve, an enlarged head carried by the free end of said neck and adapted to co-act with the stop shoulder of the outer sleeve to limit the outward projection of the inner sleeve therethrough, an extensible elastic tube connecting the head with the inner end of the outer sleeve, establishing communication between the inflatable body and said sleeve and functioning to normally retract the inner sleeve within the outer sleeve, outlet openings in the enlarged head communicating with its bore, a valve slidably mounted on the neck, and means disposed between the valve and the inner sleeve for normally projecting said valve into contact with the enlarged head to close the outlet openings, said valve being operable to relieve the inflatable body of excess pressure when the internal pressure reaches a predetermined maximum.

SAMUEL B. NOÉ.